June 2, 1953  G. REGET  2,640,444
AUTOMATIC BAKING MACHINE
Filed Aug. 17, 1946  12 Sheets-Sheet 1

Inventor
George Reget
By
Attorney

June 2, 1953

G. REGET 2,640,444

AUTOMATIC BAKING MACHINE

Filed Aug. 17, 1946

Inventor
George Reget
By
Attorney

June 2, 1953 G. REGET 2,640,444
AUTOMATIC BAKING MACHINE
Filed Aug. 17, 1946 12 Sheets-Sheet 5

INVENTOR.
George Reget
BY
Attorney

June 2, 1953 G. REGET 2,640,444
AUTOMATIC BAKING MACHINE
Filed Aug. 17, 1946 12 Sheets-Sheet 7

INVENTOR.
George Reget
BY
Attorney

June 2, 1953  G. REGET  2,640,444
AUTOMATIC BAKING MACHINE
Filed Aug. 17, 1946  12 Sheets-Sheet 8

June 2, 1953  G. REGET  2,640,444
AUTOMATIC BAKING MACHINE
Filed Aug. 17, 1946  12 Sheets-Sheet 10

INVENTOR.
George Reget
BY
Attorney

June 2, 1953  G. REGET  2,640,444
AUTOMATIC BAKING MACHINE
Filed Aug. 17, 1946  12 Sheets-Sheet 11

INVENTOR.
George Reget
BY
David Manley Heller
Attorney

Patented June 2, 1953

2,640,444

UNITED STATES PATENT OFFICE 2,640,444

AUTOMATIC BAKING MACHINE

George Reget, St. Albans, N. Y.

Application August 17, 1946, Serial No. 691,342

6 Claims. (Cl. 107—8)

My invention appertains to automatic baking machines for completely manufacturing cakes, which are baked in special tins having cavities, making possible the production of cakes of various desirable configurations, and shapes.

An important object of my invention is to provide a completely automatic baking machine, having a series of specially constructed pans, made in accordance with the teachings of my invention to be adduced hereinafter, the machine having a baking pan feeding arrangement for feeding the said baking pans continuously throughout the entire cycle of the machine, the said pans being also interchangeably, and removably, associated with the conveyor mechanism and structure of the machine; the operation performed by the said machine being the feeding of the pans in a cyclical and circuitous path so that the pans will be first sprayed, or atomized, with proper grease, or greasing substances, to prevent cakes from adhering to the cavities in the pans. Secondly, the machine is provided with a dough, or batter, feeding station to fill the pan cavities that have been greased. Thirdly, the pans are then conducted through an oven, the cakes being baked for a predetermined length of time; the conveyor speed affording sufficient time in its travel through the oven compartment, the cakes then being dropped out of the pans, which are inverted as they continue their circuitous travel on the machine; the said cakes then being passed through a semi-circular and over-lapped conveyor, operating on conical idlers, the cakes then being passed on to an auxiliary conveyor, and in turn, to a turning-over mechanism for righting the inverted cakes, right side up, the cakes then continuing into a chute for passage under suitable icing mechanism, and continuing further along the path, the machine being synchronized with carton feeding and closing means, completing the operation, from the feeding of the batter to the packaged goods after baking and completion. The machine being further provided with suitable spraying mechanism, for pressure spraying the pans after each baking operation. A drying station is also provided for drying the pans prior to repetition of the cycle, and a pan changing mechanism disposed at a point where the baking tins or pans initiate the cycle of operation, so that a number of pans may be removed, and simultaneously replaced with pans having differently shaped cavities, for baking cakes of different dimensions. The pans, preferably, are of such formation as to be guided throughout the cycle of operation, yet permit of their interchangeability and removability, the particular feature being the pan structure that makes possible the complete automatic operation for formed cakes of certain shapes and dimensions, that are baked in tins, having cavities as distinguished from the griddle type of baking machines.

Another object of my invention is to provide a complete automatic machine for baking cakes of various shapes and configurations, in tins having cavities of corresponding shapes, the said tins being interchangeably and removably attached to the machine, so that without disturbing the operation, the said baking tins, or pans, could be interchanged, the machine operating continuously, cleaning the pans after each baking operation, and drying the same for repetition of the baking cycle of operation.

Another object of my invention is to provide a baking pan, or tin, having cavities for receiving batter, and being provided with a number of openings to facilitate drying and cleaning the same through spraying operations, being also provided with end plates, which are guided in suitable guideways, the said plates having a toothed formation to engage a sprocket wheel for initially grabbing the pans and for carrying them continually through the machine during the entire cycle of operation, the said end plates also being provided with suitable pins for engaging a second conveyor for motivating intermittently the said pans through the various stations of operation; namely, the greasing, the batter feeding, and the baking operation. The said pans then being adapted to be conveyed on a conveyor to pan cleaning and drying stations, subsequently bringing them back to the initial point of operation, namely, in proper engagement with the sprocket wheel.

A further object of my invention is to provide baking pans, or tins, of the afore-mentioned character, which are made of unit widths, so that a single width pan may be used, a double width pan may be used, or a triple width pan may be used. Thus the pans would interchangeably fit and the operator would have an opportunity for interchangeably removing, or replacing the pans of a given width with pans of different widths, which will facilitate the requirements of baking institutions, in providing pans which will allow for universally satisfying the requirements of various establishments with respect to various shapes, sizes, and dimensions, as well as configurations of cakes that may be required within a certain period of baking time.

Another object of my invention is to provide a novel form of greasing mechanism for "flash spraying" the pans with a sufficient amount of grease to prevent adhesion of the cakes to the pans.

Another object of my invention is to provide novel batter feeding means for intermittently feeding the proper amount of batter into a cavity.

Another object of my invention is to provide suitable oven means for baking the cakes to proper requirements.

A further object of my invention is to provide in a machine of the afore-mentioned character automatic steam and hot water spraying units for completely degreasing the pans after the baking operation.

A further object of my invention is to provide means for drying, through heat, the pans after the washing and cleaning operation.

A still further object of my invention is to provide a mechanism of simple nature for the quick removability and interchangeability of baking pans, or tins, without disturbing the operation of the machine.

A further object of my invention is to provide in a machine of the afore-mentioned character a semi-circularly shaped dual overlapping conveyor, having conical idler rollers for transferring the inverted cakes to intermediate conveyor means, for further transfer to a righting mechanism, for turning the inverted cakes right side up from their inverted position.

Another object of my invention is to provide means of feeding the finished cakes to icing mechanism, and subsequently, and ultimately, to cartons, opening, forming, packing, and carton closing units for completing the entire operation.

A further object of my invention is to provide a machine of the afore-mentioned character, which is practical in construction, which will save considerable time, effort, and expenditure for the production of baked goods of various sizes, shapes, dimensions, and configurations, a machine which will conserve space at present occupied by many employees and many machines in producing similar results, and a machine which will increase the efficiency and output of baking operations with a minimum of cost and effort, thus making a most efficient arrangement.

Another object of my invention is to provide in a machine of the afore-mentioned character a series of conveyors made of mesh material to handle the baked cakes and permit the quick dissipation of the heat therefrom, thus tending to cool them more quickly.

Another object of my invention is to provide a righting mechanism consisting of a series of rod elements, so as to contact the formed cakes and handle the cakes through the minimum of contact therewith in turning the cakes from the inverted position to the upright position.

Other features, inherent objects, and ancillary advantages resident in my invention will become apparent to those skilled in the art from an examination of the accompanying drawings, reference being had to the ensuing description for a clearer elucidation of the structural relationship of the assemblies, sub-assemblies, and structural units comprising my invention, and in which the various parts of like nature are characterized by the same symbols or numerals, and in which:

Figure 8:
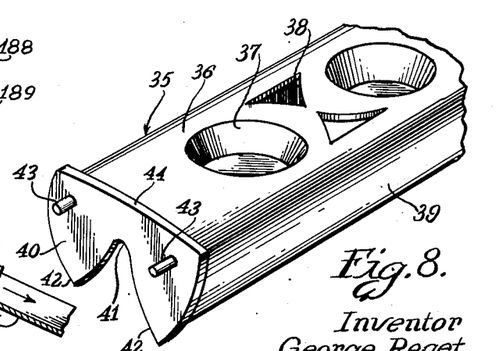
Fig. 8 is a fragmentary showing of the operative and conveying portion of a baking pan made in accordance with the practices, and teachings of my invention, the view being a perspective view.

Referring to my invention, throughout the views, it is generally designated by the numeral 34, and an important element thereof is the unit pan or tray generally designated 35 and illustrated in Fig. 8. The pan 35 consists of a metallic top 36 having the side depending aprons 39, the top surface being provided with a series of cavities 37 of any desired, or given, shape, the area of the top surface 36 in between cavities being, preferably cut out, or provided with cut out portions 38, in order to facilitate the draining and drying of the liquid used for degreasing the pan structure during its circuitous path in the machine.

Figures 1, 2:
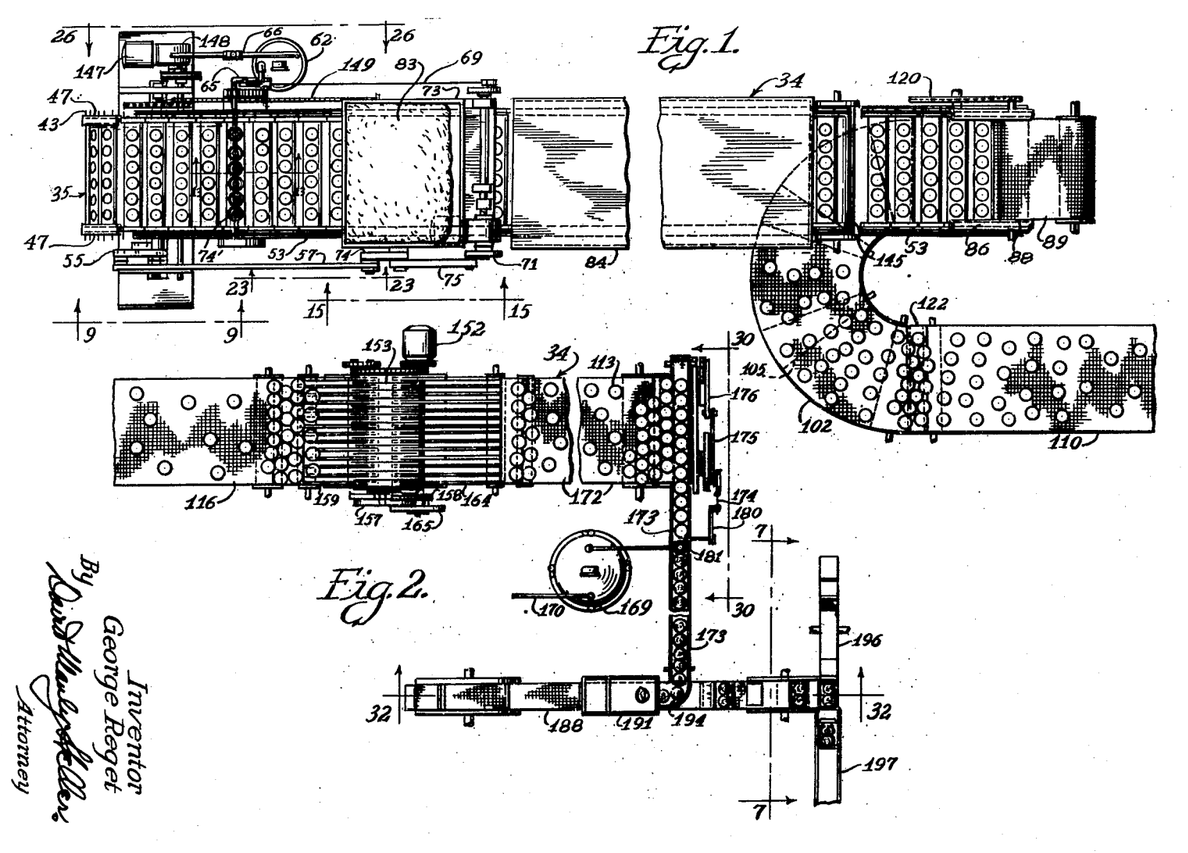
Fig. 1 is a schematic top view of that portion of my machine, which is confined to the handling of the cakes during baking and their ejection from the pans onto a transfer conveyor system.
Fig. 2 is the remaining portion of the top view of my invention in schematic relationship showing the means of righting the cakes right side up, the transfer of the cakes to suitable conveying mechanism toward the icing station, and the cartoning, or packaging stations, completing the cycle of operation.

The particular feature of my pan, as a basic pan, is in the provision of the end plates 40 used in guiding the pan, and in releasing the pan, or in maintaining it in its continuous cyclical and circuitous path in the machine during the course of continuous operation, the said end plates 40, having an end plate extension 44, for guiding the pans in their ambit of operation or, in their orbit of operation, the said end plates having a notched portion 41 so as to form a gear-like formation 42, 42 in the bottom portion of the end plates 40, to be engaged by a sprocket-like lifting drum 48; the pans also being provided with extension pins 43 secured to end plates 40, for transference of the pans from the lifting drum to the conveyor 53 carrying the pans through the operations past the greasing and batter feeding stations and on through the oven. In Fig. 1 the endless conveyor 53 is depicted as broken, where the oven 84 is also broken, to indicate that it may be longer than shown.

A careful study of the structural arrangement of the pans 35 will enable those familiar with the art to grasp the illustrations depicting the assembly, sub-assembly, and various stations of operation of the machine proper, the pan being of such a structure as to make it acceptable to automatic cyclical and continuous handling, for continuously baking cakes within pans having cavity formations of different shapes and configurations.

The further elucidation of the operation of the machine will best be understood, if we start with Figures 5, 9, 10 and 11, which indicate the pan initiating its circuitous path through the machine. In that view the pans are generally designated 35, and, let us assume, they are confined by having their end plate extensions 44 confined within the channel trackway 45, which communicates with the curved trackage 47 and permits the end plates 40, with their toothed projections 42, to enter into the confines of the pan-lifting means 48, which have a number of pins 49 for engaging the notched portion 41 between teeth 42 of the plates 40. The dual pan lifting means 48 is separated by a cylindrical spacer 51, so as to provide a confined race-way for accepting the projections, or teeth 42, of the pans 35, the pins 49 engaging the pans, and then maintaining them at predetermined distances warranted by the pins 49. Two endless conveyors designated 53 are trained to operate on driving sprockets 59 each sprocket being mounted on an intermittent shaft 52 (see Fig. 5).

The pans are thus confined and righted, right side up, from their inverted position, as can be seen by reference to their position on channel trackway 45, and ultimately reach the top position where the pan lifting means 48 which is of drum formation, being mounted on shaft 50 rotating therewith, is connected to one intermittent shaft 52, which (see Fig. 5) has mounted thereon the ratchet 54. Another intermittent shaft 52 has mounted thereon a sprocket 61' for engaging another sprocket 61'' through the interconnection of the chain transmission 61, so as to unify the intermittent operation to be produced by virtue of the movement of the leverage 55 and linkage 57 pivotably interconnected at 56, and moving to the dotted position as indicated by the arrow 58 intermittently back and forth, thus aligning the pans at their proper stations; and causing the pans 35 to be transferred from the pan lifting means 48 to the endless conveyor 53.

The motor 201 drives reciprocating disc 71, which through linkage 75 actuates linkage 74 to motivate intermittently the ratchet 54 imparting motion to one endless conveyor 53. The said endless conveyor 53 is composed of one chain trained over one sprocket 85. The said sprocket 85 being rigidly secured to its companion sprocket 85, over which another chain of the endless conveyor 53 is trained and disposed parallelly to the said first-mentioned chain of the endless conveyor 53. The said other endless conveyor 53, through the transmission 61, motivates the pan lifting means 48 through shaft 50 in synchronism with conveyors 53.

Endless conveyor 53 is driven about the driving sprocket 59, and motivated by the pawl 60, alternately engaging the ratchet 54, and through escapement moving back without motivating the ratchet except when moving from the full line to the dotted line, yet on the return stroke, no motivation is offered the ratchet 54. Thus a proper timing is effectuated for intermittently feeding the pans 35 and transferring the same from the pan lifting means 48 to where the pins 43 will be caused to nest within proper indentations in the link, or endless chain conveyor 53, the same being also further confined in order to continue their path of movement, as will more clearly appear by reference to the figures following. This assembled unit may be supported on a projection, or support 46 emanating from the base of the machine.

Figures 12, 14:
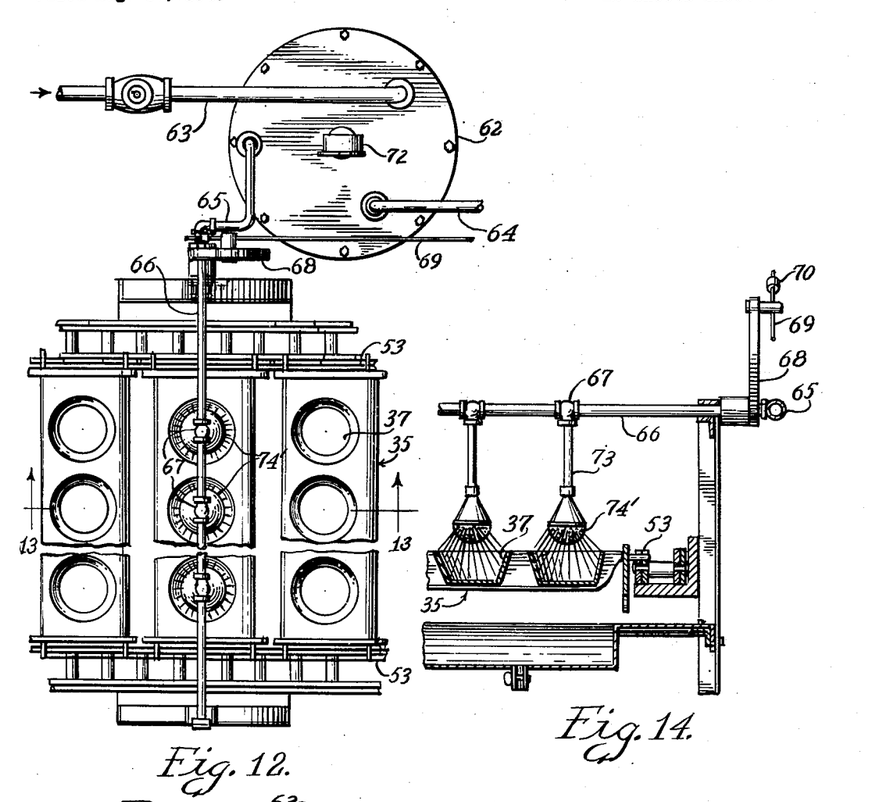
Fig. 12 is a view looking in the direction of the arrows 12—12 of Fig. 3.
Fig. 14 is a sectional view taken, substantially, on the lines 14—14 of Fig. 13.
Figure 13:
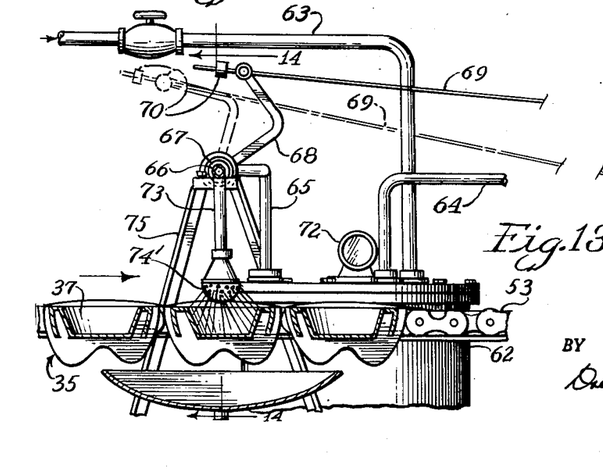
Fig. 13 is a view looking in the direction of arrows 13—13 of Fig. 12, and is a cross-sectional view taken, substantially, on the said line.

Referring to Figures 12, 13 and 14, the greasing of the pans is illustrated, a preliminary operation, so as to subsequently facilitate the ejection, or dropping out, of the finished cakes, preventing the batter from adhering to the pan cavities 37, will now be more lucidly explained. In this view, a grease tank 62 is provided with a pressure gauge 72, in order to permit adjusting the same to suitable pressure for conveniently serving the needs of the machine, the tank 62 being provided with an air inlet 63 from a compressor, a grease intake line 64, and an outlet line 65 connected through the common manifold 66, and having a series of individual extensions 73, each directed over a cavity in a pan, there being as many connections, or outlets 73, as there are cavities in the respective pans to be employed being connected by T units 67. The cavities 37 are thus sprayed through the nozzle head 74 whenever the valve structure is operated through its connection to the bell crank 68, which in turn is adjustably secured to the operating cross-rod 69, which in turn, is connected to the reciprocating disc 71, the adjusting collar 70, serving to be positioned at various points at the end of the propelling rod 69, so as to offer a regulating adjustment for the time and amount of spray to be atomized through the head 74'. The reciprocating disc 71 operates intermittently through its connection to suitable driving means, which also operates and effectuates a proper feeding of the required amount of batter, as will subsequently appear from an explanation of the batter containing hopper and the feeding of the contents therefrom.

Figure 15:
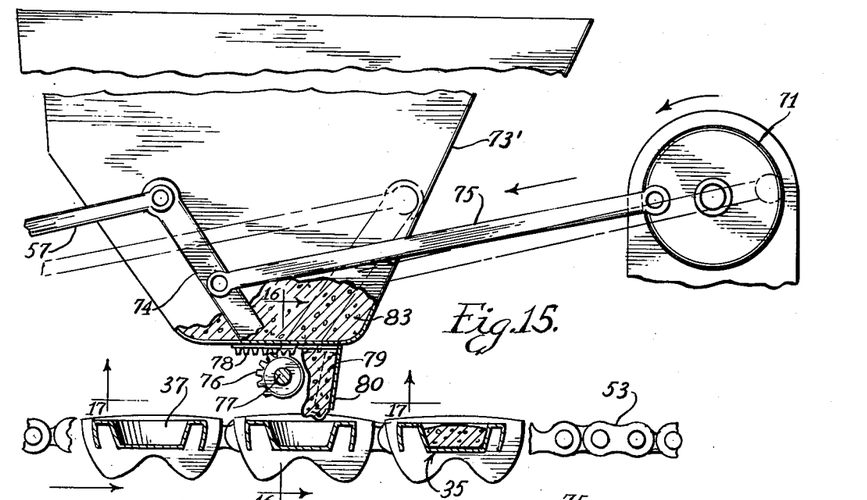
Fig. 15 is a view looking in the direction of the arrows 15—15 of Fig. 1.
Figures 16, 17:
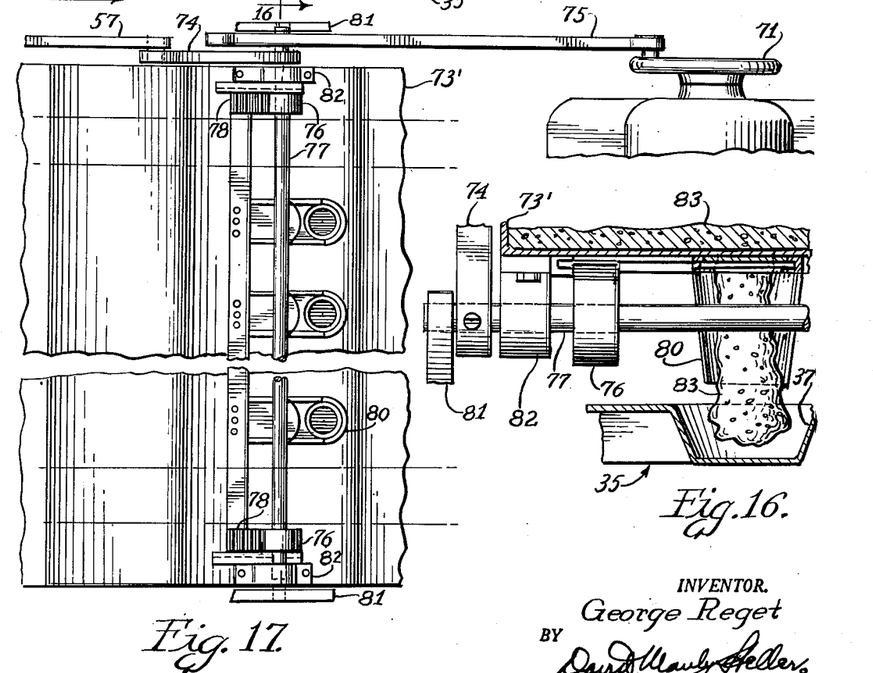
Fig. 16 is a sectional view taken, substantially, on the lines 16—16 of Fig. 15.
Fig. 17 is a view looking in the direction of the arrows 17—17 on Fig. 15.
Figure 18:
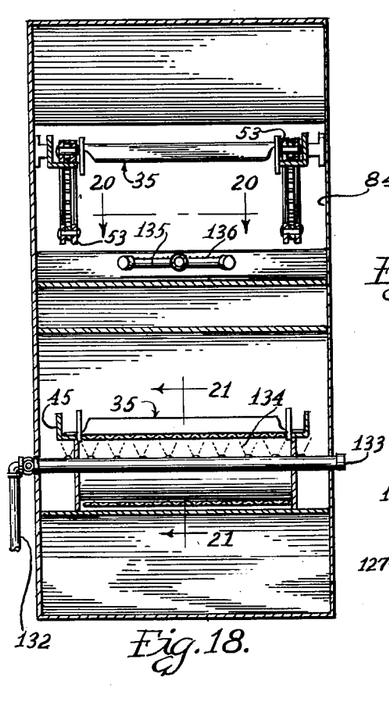
Fig. 18 is a sectional view taken, substantially, on the lines 18—18 of Fig. 3.
Figure 19:
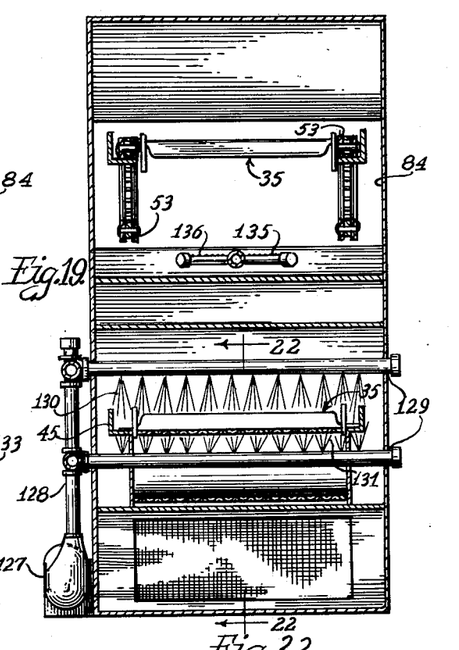
Fig. 19 is a sectional view taken, substantially, on the lines 19—19 of Fig. 3.
Figure 20:
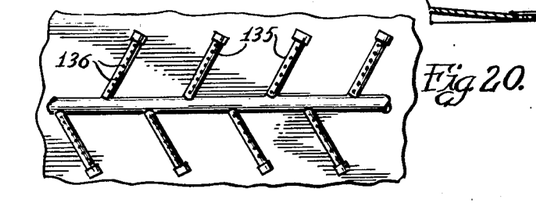
Fig. 20 is a view looking in the direction of the arrows 20—20 of Fig. 18.
Figure 21:
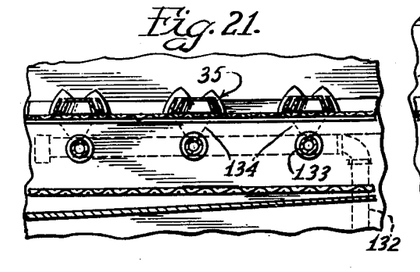
Fig. 21 is a view looking in the direction of the arrows 21—21 on Fig. 18, it being substantially a cross-sectional view, taken on that line.
Figure 22:
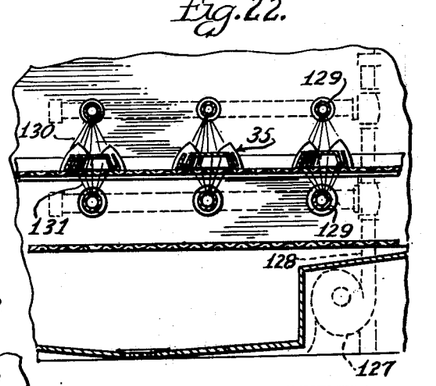
Fig. 22 is a sectional view taken, substantially, on the lines 22—22 of Fig. 19.

From the greasing station, after preparation of the pans with a fine atomized spray of oil, or other similar greasing agent, we proceed to the batter feeding station, which is best illustrated in Figures 15, 16, and 17. A large hopper, designated 73', which is supported on suitable extensions 81 of the machine, in turn providing a bearing 82 for the shaft 77, on which is mounted the rotating pinion 76, which, when motivated, will operate the trap door equipped with the rack teeth 78 in engagement with the pinion teeth 76, the hopper 73' being provided with a suitable quantity of batter 83, an opening therein to register and align directly above the cavities 37 of the respective pans being used, and brought in alignment thereunder by means of the endless conveyor 53. Thus, when the trap door, by virtue of its rack 78 having been moved to the left, is opened, a quantity of batter will flow through. Thus, when the rack teeth 78 of the trap door are moved to the left, as indicated in Figure 15, the trap is opened, and will allow a suitable quantity of batter 79 to drop therethrough, into the cavity 37 of the pan directly below it.

Figure 30:
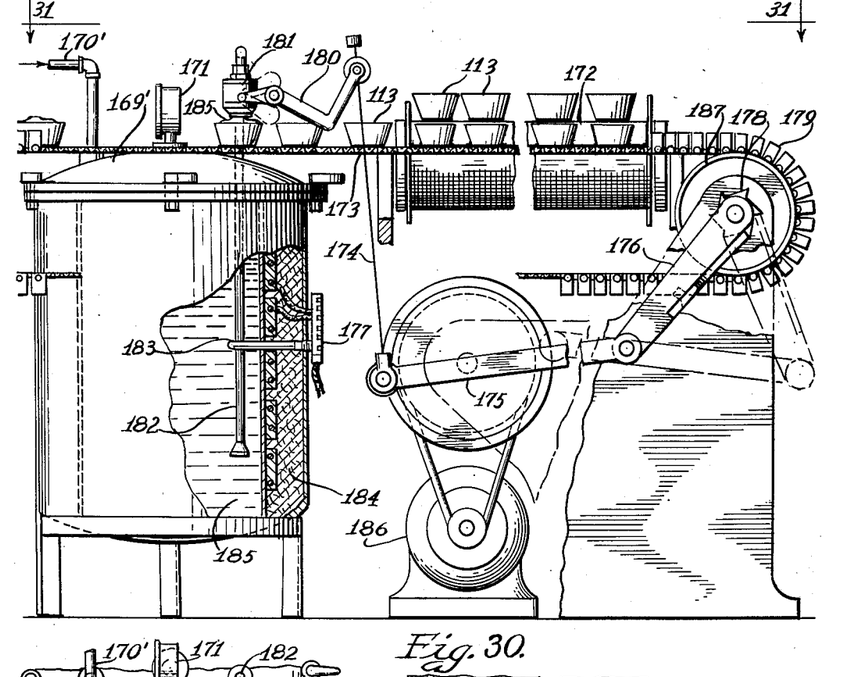
Fig. 30 is a view looking in the direction of the arrows 30—30 of Fig. 2.
Figure 31:
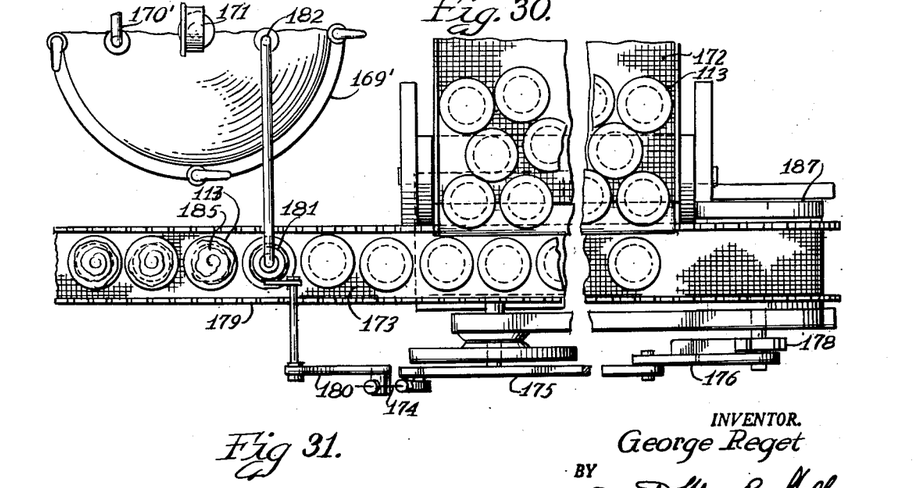
Fig. 31 is a view looking in the direction of the arrows 31—31 of Fig. 30.

It is to be noted in this instance that I provide a guard 80, the province of which is to direct the batter to a downward flow into the cavity 37 of the pans 35, being brought into alignment thereunder by virtue of the endless conveyor 53, which nests the extension pins 43 of each pan 35. The pinion 76 is motivated on the shaft 77 by virtue of the linkage 74 connected to the linkage 57, which induces the intermittent motion to the pan lifting means 48 heretofore referred to, and which is also interconnected through a motivating linkage 75 to the intermittently and reciprocably operative unit, or disc 71, heretofore mentioned, and to which the valve mechanism for greasing the pans is also regulatably connected. Thus, when the disc 71 is motivated intermittently clockwise, and counterclockwise, as seen in Figure 15, and as indicated in Figure 30, simultaneously pans registering under the nozzle 74' will be greased, while at the same time pans that have passed the greasing station will receive batter as indicated by Figures 15, 16, and 17.

Figure 3:
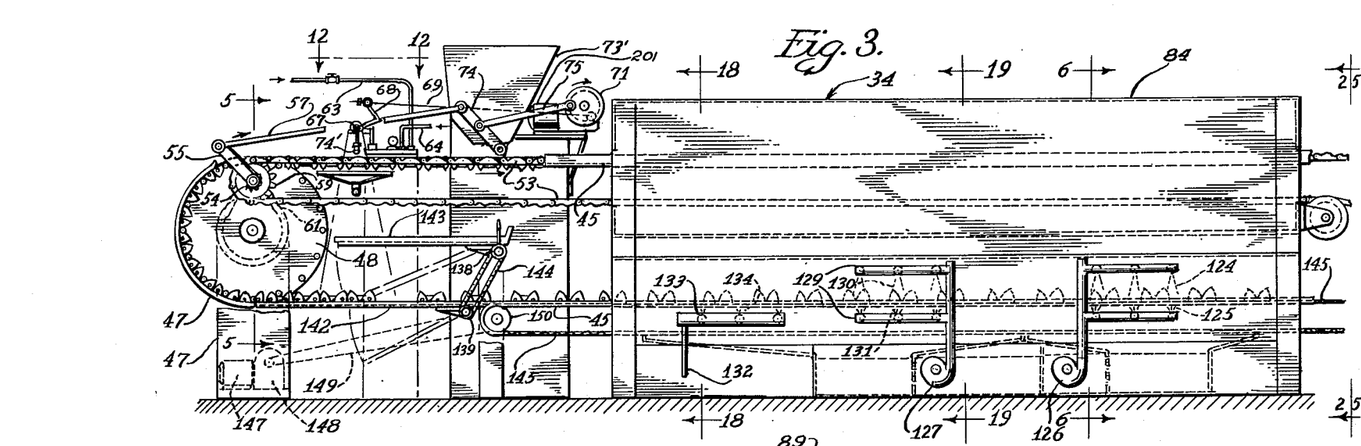
Fig. 3 is a front view of that portion of the machine which is confined to handling the pans in continuous circuitous paths, greasing the pans, feeding the batter, and baking in the oven, showing also the method of the stations for degreasing the pans, and for drying, as well as the stations where pans are interchangeably removable and replaceable instantaneously without disturbance of the operation of the machine.

We are now ready to proceed to the next operation. The batter will now enter the confines of the oven 84 (see Fig. 3) which is long enough, in order to insure the proper timing and travel of the cakes through the oven, to assure proper baking. The pans then are ready to emerge from the oven 84, and are adapted to be dumped by virtue of the dumping and transfer station, illustrated in Figure 27. When the pans 35, with the baked cakes 113 therein emerge from the oven 84, they pass to the dumping and transferring station of the machine. This station consists of a rounded or semi-circular end trackage 86 merging with the channel trackway 45 in the horizontal support, and the motivating endless chain conveyor 53 supporting the pins on the pans 35 is mounted on a pair of driven sprockets 85, which in turn are mounted on the axle 92, supported in suitable bearings 91 supporting at the top thereof, the idler rollers 88 in conjunction with the auxiliary bearings 90, so as to mount thereon the mesh endless conveyor element, consisting of the top section 89, and having an interior surface configurative with the semi-circular end trackage, or guide-ways 86, the rollers 88 being motivated by a sprocket connected through the chain 87 to another sprocket on the axle 92.

Thus, the conveyor. consisting of the top section 89, the downwardly depending section 93, is held tautly, confined by means of the tightener rolls 95 and 94, which permit the mesh to pass through diagonally therebetween as indicated at 97. The counterweight support 96 affording an even tension by virtue of the mass 118 at the end thereof (see Figs. 4 and 27). The conveyor has a bottom portion 98, passing over an idler roller 99, and then back to connect with the top section 89, by being tautly stretched over the radial, or circular portion of the end trackage 86. The idler roller 99 is connected by chain transmission through the chain transmission 101 and the sprocket 100 to another roller, which is designated 105, and of conical formation, a series of such rollers being arranged in semi-circular fashion and supported by bearings 104, in turn connected suitably to the supporting frame 117, so as to form a duplex, overlapping, semi-circular, endless conveyor belt by virtue of the mesh conveyor formed of the portions 102 and 103, being trained over the conical idlers 105, and connected to drive the roller 109 for transference to the inclined, or elevated, endless conveyor 110, also made of mesh material to facilitate cooling of the cakes. The brackets 107 act as supports for the roller 109, and the last conical roller 106, the sprocket 108 and the transmission chain 110' serving to transmit motion to the endless elevated mesh conveyor 110, which is trained over another idler roller 112, supported on bearings 111.

A transfer platform 122 is provided to span the gap between the end of conveyors 110 and the semi-circular duplex conveyor formed of sections 102 and 103 heretofore described. The cakes 113 are dropped in inverted position from the pans, the pans then being pushed along the channel trackway 45, whereas the cakes are pushed along, and continue on to the conveyor 116, mounted on the idler 115, the space between idlers 115 and 112, that is, the gap therebetween being spanned by the space filling platform 114, which facilitates the conveying of the cakes continually along the lines of transmission indicated up to the present instance.

Figure 4:
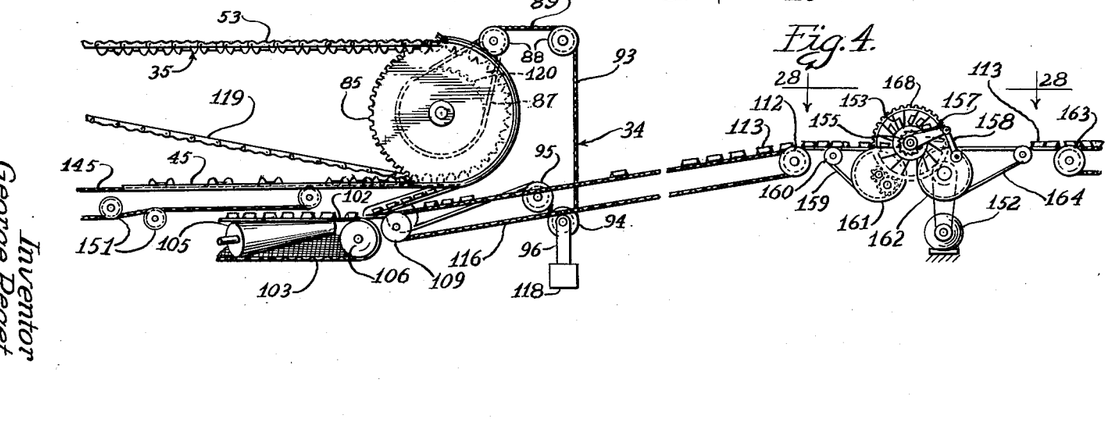
Fig. 4 is a composite structure showing the transfer mechanism from the cake dumping station where the cakes are ejected and conveyed toward the righting, or inverting the cakes from their inverted position to the right side up position.
Figure 5:
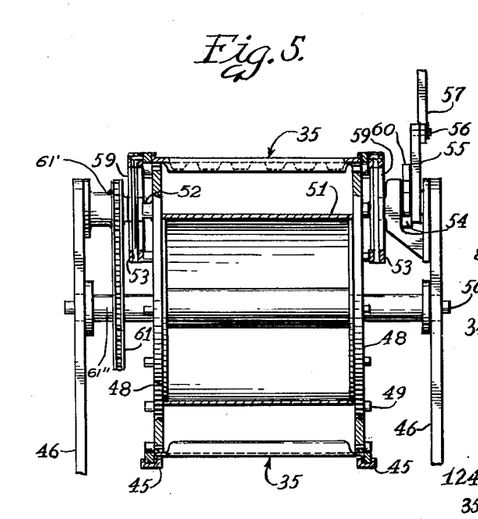
Fig. 5 is a cross-sectional view taken, substantially, on the lines 5—5 of Fig. 3.
Figure 6:
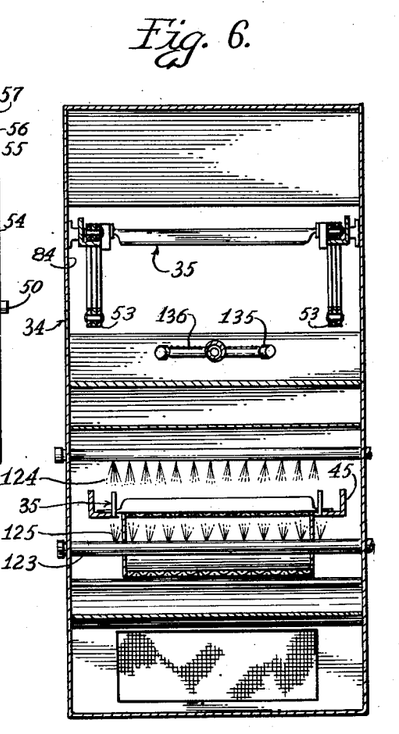
Fig. 6 is a longitudinal cross-sectional view taken, substantially, on the lines 6—6 of Fig. 3.
Figure 7:
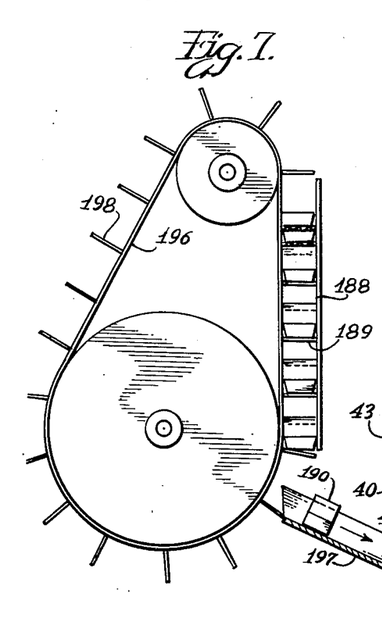
Fig. 7 is a view taken, substantially, on the lines 7—7 of Fig. 2.
Figure 27:
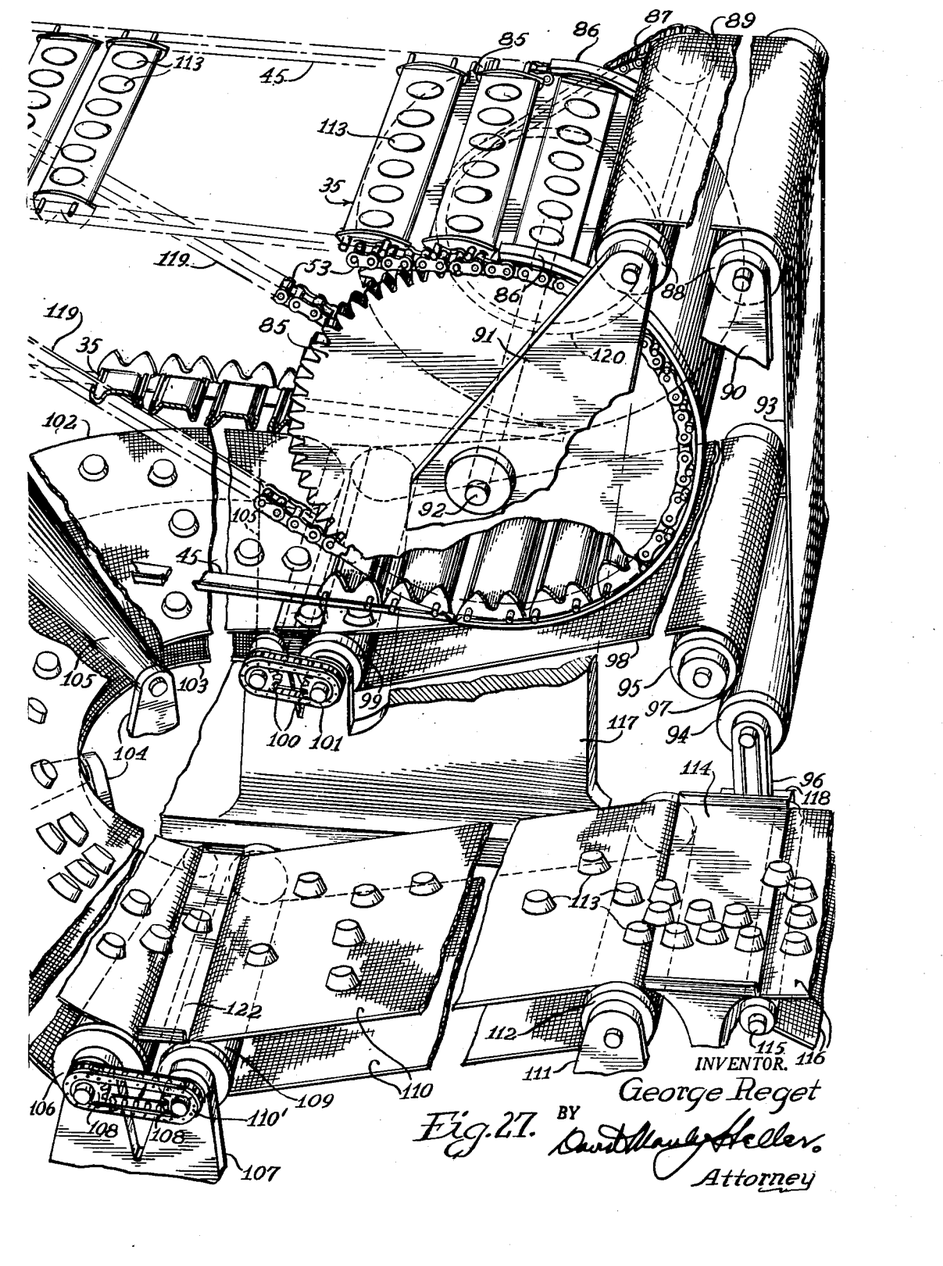
Fig. 27 is a perspective view, with certain portions broken away, in order to more clearly indicate the transfer conveyor mechanism, of semicircular duplex overlapping arrangement, being supported by conical idler rollers, and which indicates a special and particular feature of my invention.
Figure 28:
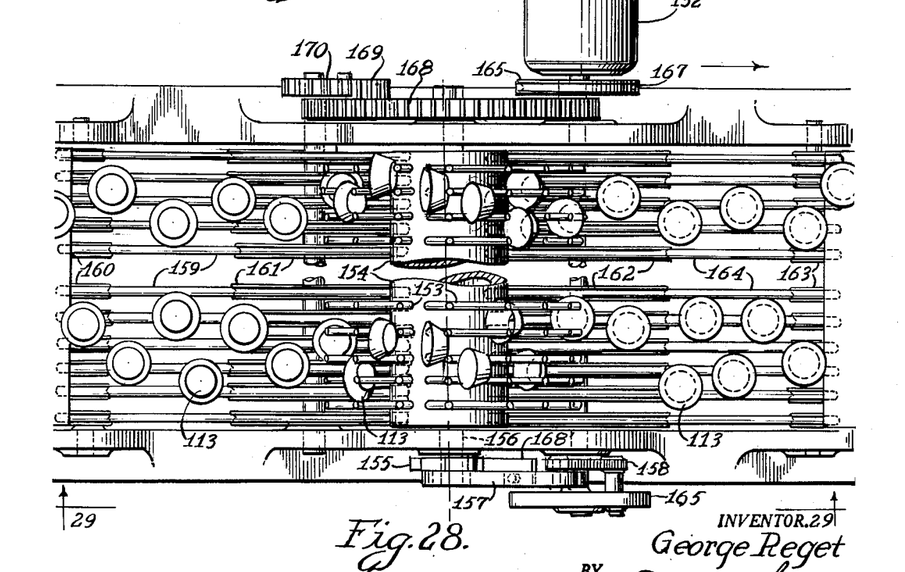
Fig. 28 is a view in the direction of the arrows 28—28 of Fig. 4, and is also a view looking in the direction of the arrows 28—28 of Fig. 29.
Figure 29:
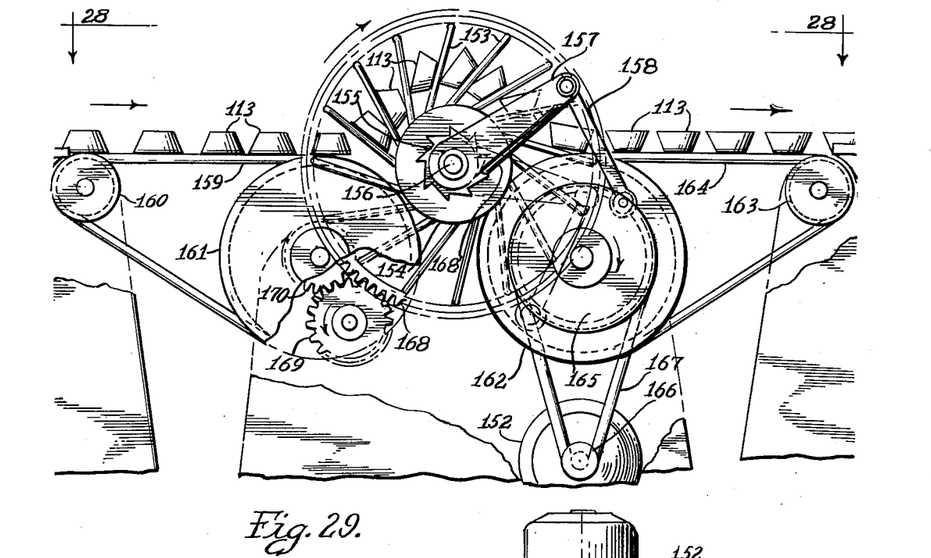
Fig. 29 is a view looking in the direction of the arrows 29—29 of Fig. 28.

The endless chain 53 is preferably caused to return, as indicated at 119, Fig. 27 and Fig. 4, so as to permit the pans to slide in inverted position on the lower guide channel trackway 45 for degreasing, rinsing, and drying operations, as will hereinafter appear from the further elucidation of the various figures indicating, and depicting those operations.

The cakes, however, being now in inverted position, have to be righted right side up for icing and for packing. It is also to be noted that the sprocket 120 mounted outside of one of the driven sprockets 85 by virtue of chain transmission means 87, affords motivation through proper sprockets mounted integrally with the left hand roller 88 (see Fig. 4 and Fig. 27) thus motivating the endless mesh conveyor consisting of sections 89, 93 and being configurative with the ends of the end trackage 86, causing the same to be motivated in synchronism with the intermittent motion of the endless conveyor 53. The pans 35 are pushed back towards the pan lifting means 48 merely by one contacting the preceding one, or the one ahead thereof, and thus the pans are pushed along until the pan lifting means 48 causes the cycle of operation of the pans to be resumed.

During their pan pushing operation on the channel trackway 45, the pans are first degreased. The pans 35 (see Figs. 18, 19, 20, 21 and 22) then continue until they pass the degreasing station, which consists of a water pump, or liquid feeding pump 126 connected to an upright piping having extensions 123 above and below the channel trackway 45, so as to provide a downwardly streaming jet of hot water and steam 124, and an upwardly spraying series of jets of hot water and steam 125, causing the liquid to penetrate, and cover all surfaces of the pans 35, and thus degrease them. The pans then travel to another station, which is called a rinsing station, and consists of a similar pump arrangement 127 propelling the hot water and steam through the upright pipe 128 having horizontally disposed extensions 129 above and below the guide channel trackway 45, and providing the downwardly flowing rinsing jets 130, and the upwardly sprouting rinsing jets 131. Thus, thorough degreasing will have been performed.

The pans 35 are then ready to pass to the drying station, which drying station consists of a blast of hot air, which is fed in through the inlet 132 having a series of horizontal extensions 133, from which emanate a series of branches, provided with minute orifices, from which the jets of hot air 134 are caused to stream, and thus cause to dry the pans passing thereover. It is to be noted that the openings 38 in the pans 35 will afford a quicker drying, inasmuch as they will have a lesser surface exposed for liquid rinsing and cleaning liquid to adhere thereto, thus facilitating and expediting the drying of the pans. The oven burners consist of manifolds 135 having burner orifices 136 (see Fig. 20). The pans will then follow along the channel trackway 45, and be ready to pass on, and be engaged by, the pan lifting means 48 to continue the cycle of operation, unless the displacement station is operated.

Figures 9, 10, 11:
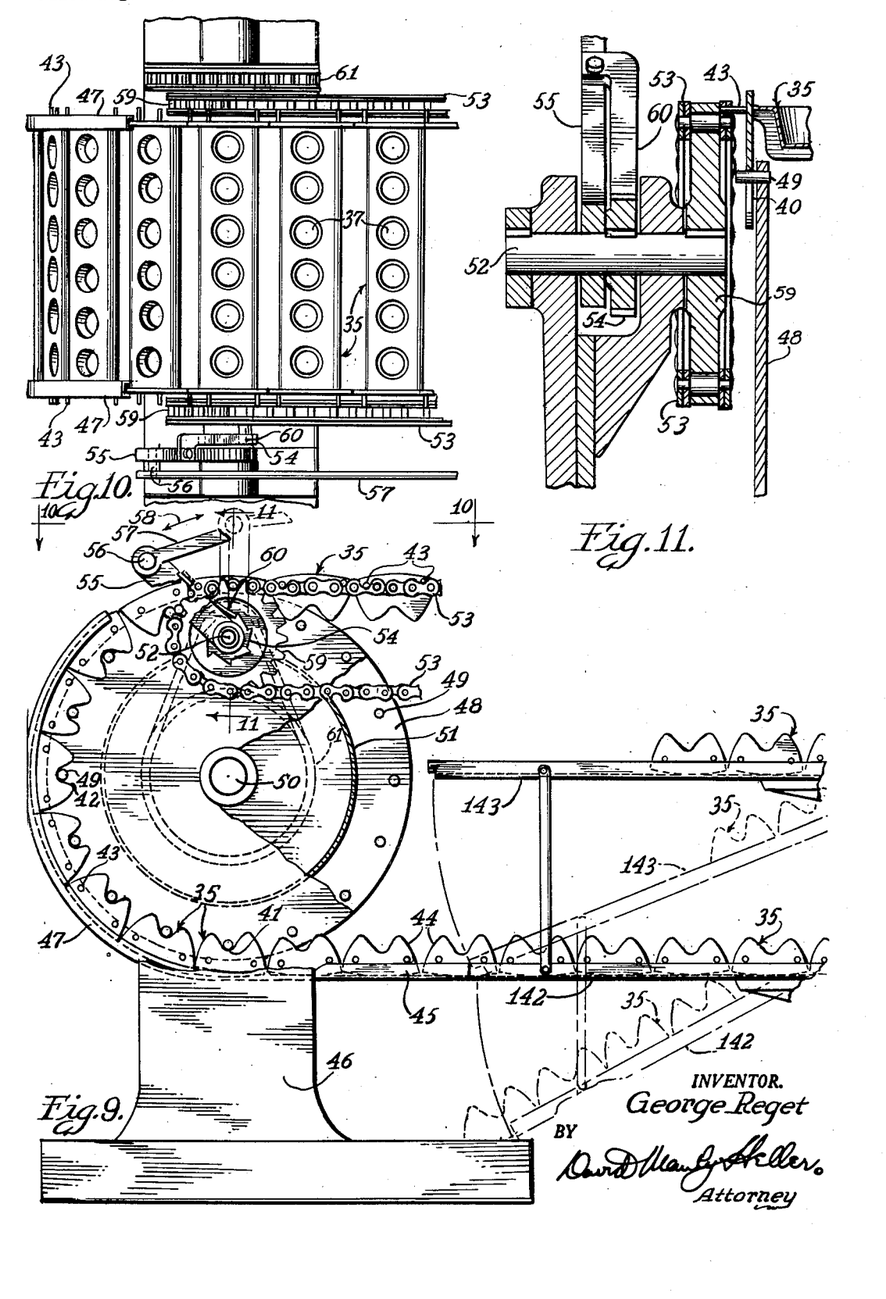
Fig. 9 is a view looking in the direction of the arrows 9—9 of Fig. 1.
Fig. 10 is a view looking in the direction of the arrows 10—10 of Fig. 9.
Fig. 11 is a sectional view taken, substantially, on the lines 11—11 of Fig. 9.
Figures 23, 24, 25:
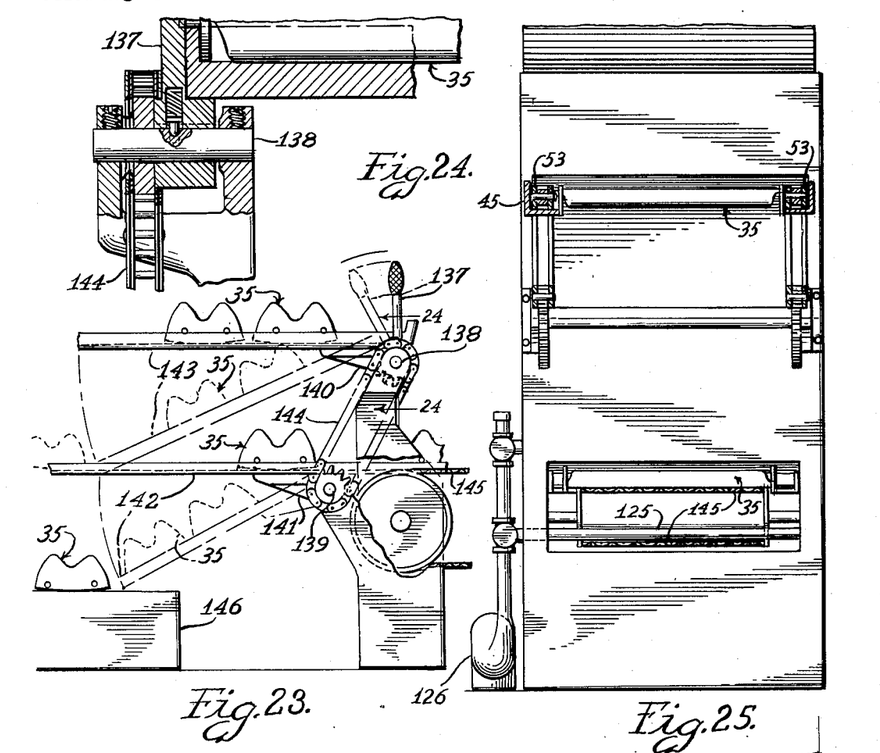
Fig. 23 is a view looking in the direction of the arrows 23—23 on Fig. 1.
Fig. 24 is a sectional view taken, substantially, on the lines 24—24 of Fig. 23.
Fig. 25 is a view looking in the direction of the arrows 25—25 of Fig. 3.
Figure 26:
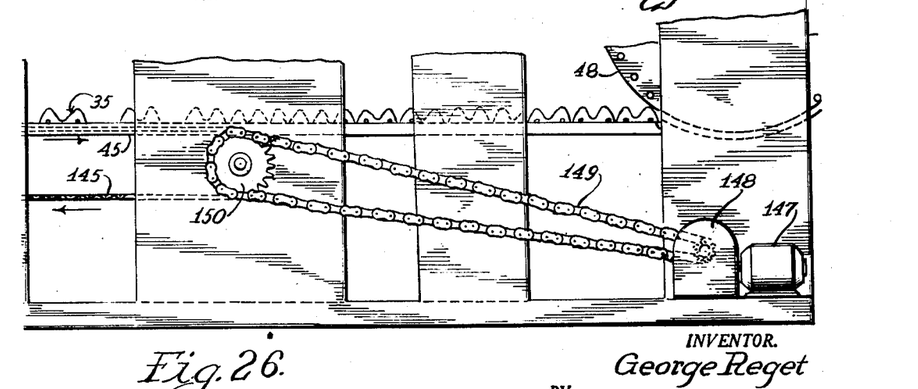
Fig. 26 is a view looking in the direction of the arrows indicated on Fig. 1.

The interchanging, or pan changing station, is illustrated in Figures 23, 24, and Figure 9, and consists primarily of two pivotably movable channel sections 142 and 143, mounted pivotably by virtue of brackets 140 and 141 to the shafts 138 and 139 respectively, each shaft attached to bearings in the framework at some suitable place. The two shafts 138 and 139 have secured thereto sprockets, which are connected by the chain transmission means 144, so that the two channel sections 143 and 142 will move in unison angularly within the ambit indicated by the dotted lines, causing the pans on channel 142 to be thrown out from the machine, and deposited on the surface 146, whereas the new pans to be used, and resting on the channel 143, will be caused to drop onto the channel trackway 45, in view of the alignment thereof, as indicated by the dotted position of Fig. 23. The manipulating lever 137 is moved within the range indicated by the dotted lines in the direction of the arrow, Fig. 23. Thus, while the machine is in operation, pans that should replace other pans to be taken out of the circuitous and cyclical operation of the machine, and the replacing pans are deposited on the channel 143 as a support thereof, merely by motivating the lever 137, the pans resting on the channel 143 are forced to slide into the bottom channel trackway 45, and ultimately to be transferred by virtue of the pan lifting means 48, whereas the pans resting on the channel section 142, are caused to drop out of the circuitous path and use of the machine to a depositing surface 146, or a suitable receptacle for collecting the same may be provided.

One prime mover used is the motor 147, connected to the speed reducer 148, which through suitable chain transmission 149 is connected to the sprocket 150. The lower conveyor 145 is provided, in order to aid in the movement of the pans to the degreasing station, the rinsing station, and the drying station, this conveyor being also provided with conveyor tightening or adjusting means, generally designated 151.

A prime mover 152 is provided for driving the cake righting system. The cakes, after having been conveyed on the mesh conveyor, which is somewhat elevated, are deposited in inverted position on the endless conveyor 159, trained over idlers 160 and 161, which are caused to be driven by means of gearing 168, 169, and 170, being positioned in meshing relationship, so as to motivate the conveyor 159. A similar conveyor 164 trained over pulleys 163 and 162 receives the cakes 113 in the righted position. The intermediate mechanism is the righting mechanism, and that is driven through the prime mover 152 through suitable belting transmission 167 trained over the pinions 166, and the driving pulley 165. The said driving pulley has a disc secured thereto, and is adapted to intermittently motivate the link 158, connected pivotably to the lever 157, which in turn is fastened to the ratchet 155, mounted on the shaft 156. On the shaft 156 there is mounted the drum 154, to which are secured a number of radially mounted rods 153, so as to afford a minimum of contacting with the baked cakes 113, and as can be seen, the cakes 113 are pushed along from the left, or their inverted position, they are received on the radially mounted rod arrangement 153, which, when the device is rotated and motivated by means of the ratchet 155 and the escapement pawl 168', affords an intermittent action to the ratchet 155. The cake righting means by virtue of its radially mounted rod structure 153, and being inclined, causes the cakes 113 after having been turned over, to be deposited on the conveyor 164, and from thereon continue to have further operations performed thereupon.

The cakes are then passed from the righting station onto the conveyor 172, where they are caused to drop a slight distance onto the unit conveyor 173, causing the cakes to travel in single file and unitary alignment. The cakes then are brought past the icing station by means of the conveyor 173. The icing station consists of a suitable drum, or container 169', having pressure gauge facilities 171, in order to indicate the pressure activity thereof; a suitable air pressure connection is secured from a remote point by virtue of the piping 170', the icing 185 being ejected through the outlet 182, which is suitably supported by means of supports 183. It is to be noted that this icing arrangement is suitably jacketed, so as to confine insulation and heating circumferentially thereabout at 184, the heating being supplied by electrical energy and suitable electrical connections as indicated at 177.

The outlet 182 is connected to an icing ejector valve 181, which is operated through the bell crank 180, connected to the motivating rod 174, interconnected through linkage 175 and 176, to be motivated by the motor 186 through proper pulleys and transmission, not numerically designated, to cause the ratchet 178 to operate the idler 187, thus motivating the endless conveyor 173, and causing the cakes 113 to pass the icing ejector valve 181. The said conveyor should be preferably provided with side wipers 179, so as to confine the cakes and prevent accidental displacement of the cakes 113. Thus, the cakes are conveyed to the icing station.

Figures 32, 33:
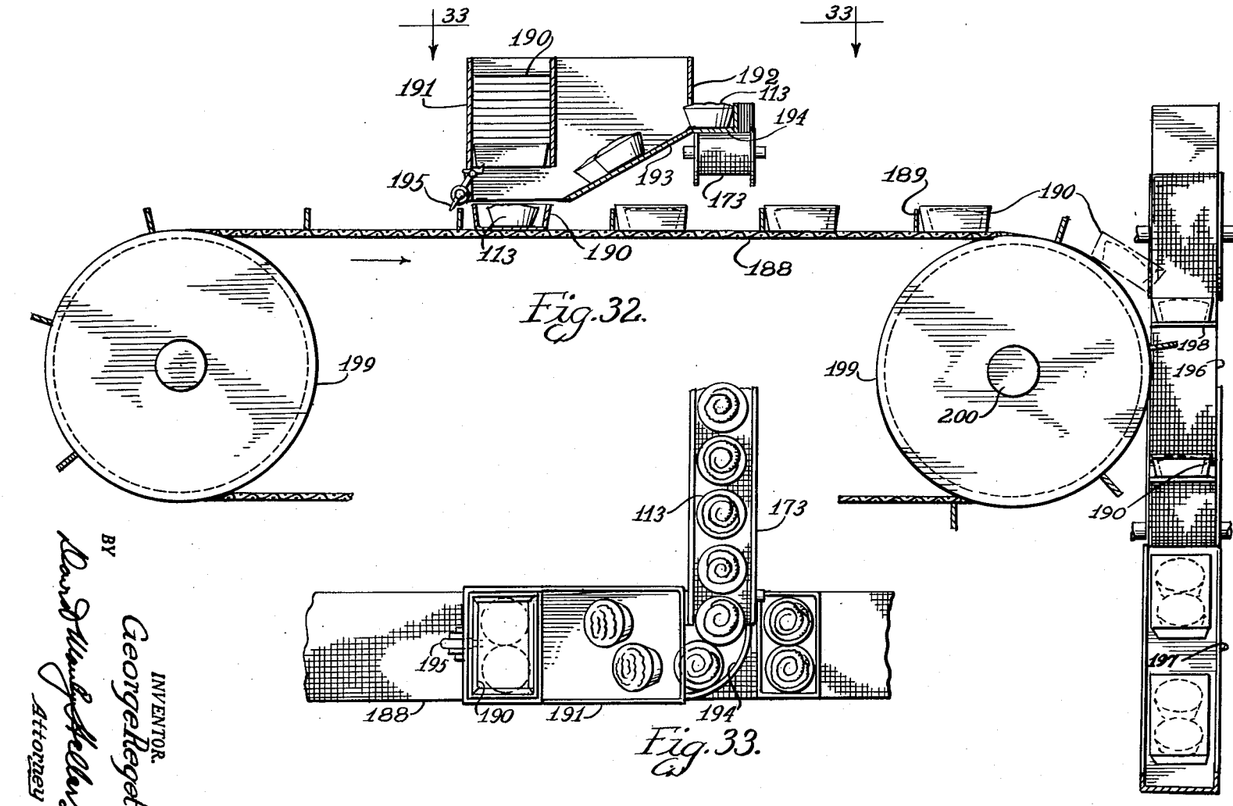
Fig. 32 is a cross-sectional view taken, substantially, on the lines 32—32 of Fig. 2.
Fig. 33 is a view looking in the direction of the arrows 33—33 of Fig. 32.

From the icing station, a boxing arrangement is provided, and is best illustrated in Figures 2, 32 and 33. The station for assembling the cakes into the boxes is best indicated in Figures 32 and 33, where the endless conveyor 188, having motiating ledges 189, pushes the boxes along intermittently as the pulleys 199 supporting the endless conveyor 188 are driven, because they are mounted on the shaft 200. The said conveyor having positioned thereover a hopper-like arrangement 191, in which the boxes 190 are nested, and supported on one end by tripper means 195, which is tripped by the ledges 189 when they pass thereunder, thus causing a single box to be dropped into position. The hopper 191 is provided with an extension, which has an opening therein, and is designated 192, having an opening for allowing the boxes 190 to drop through, having a further opening for allowing the cakes 113 supported on the conveyor 173, to be dropped into the openings in the boxes 190, by virtue of the slidably supporting connecting inclined plane 193 on which the cakes 113 are caused to be slid by the actuation of gravity. The boxes then continue their travel by virtue of the conveyor 188, until they intercept the pocket 198 of the drum 196, receiving each box, then ultimately causing the said boxes, through the rotation of the drum 196, to be deposited in the inspection chute 197, where an operator, after inspection, may close the boxes, or a number of operators may be required to perform that function.

It is to be noted that the conveyor 173 for conveying the cakes in units, or single files, has an arcuate transmitting connection 194 to facilitate the diversion of the path of the cakes in single file to a 90° turn in their path of travel, in order to be deposited, by gravity, into the boxes 199, through the intermediately inclined platform, or support 193.

Thus, by referring to the schematic views of Figures 1, 2, 3 and 4, it can be seen that I have provided an automatic baking machine, which will take replaceably, removably, and interchangeably a variety of tins having varied recesses and baking cavities therein, for providing a wide variety of baked cakes of different shapes and consistencies wherein the entire operation is automatic, including automatic greasing of the pans, automatic feeding of the batter, automatic baking, automatic ejection of the baked products from the tins, automatic transferring of the cakes from the inverted position on being ejected from the tins, or pans, to an automatically uprighting or setting device for the cakes, the cakes then being automatically fed to icing mechanism, from the icing mechanism the cakes being transported automatically to a box, or carton feeding station, the cakes assembled into the cartons, and from there, the cakes being conveyed by a drum to an inspection chute, ultimately the cartons being closed, and the operation being completed, whereas the circuitous path of the pans after the products baked therein have been ejected therefrom, are caused to travel in an independent circuitous path, whereby they are brought to a degreasing station, a rinsing station, and a drying station. An important feature of my automatic machine being that I provide a pan interchanging mechanism, which affords ready and instantaneous interchangeability of pans automatically discarding a corresponding number of pans from the machine without it being necessary to stop the several prime movers, which motivate the machine.

Another important feature of my invention, as can be readily seen, and which is responsible for the attributes flowing therefrom is the particular cavity type of pan structure, with the transmission and locating means on the edges thereof, which facilitates the cyclical and circuitous handling of the said pans automatically in the machine, and without which such a machine would not be possible.

I am quite familiar with the fact that there are some automatic machines which bake on a griddle type of principle, wherein an endless steel belt is used, and the batter poured thereon; however, for baking cakes of special shapes and configurations, a machine such as constructed in accordance with the teachings of my hereinbefore expounded clarification and exposition is mandatory.

Another important feature to be stressed with respect to my invention is that the pans will be in unit width formation, permitting interchangeability for large cakes, or small cakes, by making pans of even multiples of the unit widths. For example, 1, 2, 3, and so on, meaning once, twice and three times the unit width of a particular pan, after the unit width had first been determined. The best happy medium, perhaps, might be a 3" width of pan, which will accommodate small cup cakes and provide a multiplicity of cavities and molds therefor.

In the foregoing specification, and in the accompanying drawings, my invention is believed illustrated in the form considered to be the best suggestively, but it is to be understood that my invention is not to be limited to such form, inasmuch as it may be embodied in other forms, and it is also to be understood that, in and by the claims following the description, it is desired to cover my invention in whatsoever form it may be embodied.

Having thus described and revealed my invention, what I claim as novel and desire to secure by Letters Patent, is:

1. In an automatic tray conveying machine, a tray, comprising a top and two side apron portions depending therefrom, end plates secured to the said top and side apron portions and provided with a toothed bottom formation adapted to be grabbed for initial feeding of the said tray, and guide pins secured adjacent to the top edges of the said end plates for transference of the said tray from the said initial feeding to a conveyor.

2. In an automatic tray conveying machine, including a multiplicity of trays, each tray having a top and two side apron portions depending therefrom, end plates secured to the said top and the said side apron portions and provided with a toothed bottom formation adapted to be grabbed for initial feeding of the said trays, and guide pins secured adjacent to the top edges of the said end plates for transference of the said trays from the said initial feeding to a conveyor for further conveyance thereof; channel trackway means supporting the said trays in inverted position, tray lifting means provided with pin means engaging the root portions of the said toothed bottom formation simultaneously lifting and positioning the said trays face upwardly, driving sprocket means having its vertical axis in the same geometric plane with that of the said tray lifting means, driven sprocket means, endless conveyor means trained to operate on the said driving sprocket means and on the said driven sprocket means for receiving the said trays from the said tray lifting means and conveying the said trays by virtue of the said guide pins resting thereupon, curved trackage means connected to one terminal portion of the said channel trackway means and enveloping substantially the outer portion of the said tray lifting means confining the said trays in their orbit of travel toward being positioned face upwardly, chain transmission means interconnecting the said tray lifting means and the said endless conveyor means, ratchet means secured to the said driving sprocket means, linkage means provided with pawl means engaging the said ratchet means, reciprocating disc means connected to the said linkage means imparting intermittent motion thereto, a prime mover connected to drive the said reciprocating disc means, and semi-circular end trackage means secured to the other terminal portion of the said channel trackway means for inverting and returning the said trays to the said channel trackway means to repeat the cyclical operation of the said trays.

3. In an automatic tray conveying machine, including a multiplicity of trays, each tray having a top and two side apron portions depending therefrom, end plates secured to the said top and the said side apron portions and provided with a toothed bottom formation adapted to be grabbed for initial feeding of the said trays, and guide pins secured adjacent the top edges of the said end plates for transference of the said trays from the said initial feeding to a conveyor for further conveyance thereof; channel trackway means supporting the said trays in inverted position, a tray lifting means provided with pin means engaging the root portions of the said toothed bottom formation simultaneously lifting and positioning the said trays face upwardly, driving sprocket means having its vertical axis in the same geometric plane with that of the said tray lifting means, driven sprocket means, endless conveyer means trained to operate on the said driving sprocket means and on the said driven sprocket means for receiving the said trays from the said tray lifting means and conveying the said trays by virtue of the said guide pins resting thereupon, curved trackage means connected to one terminal portion of the said channel trackway means and enveloping substantially the outer portion of the said tray lifting means confining the said trays in their orbit of travel toward being positioned face upwardly, chain transmission means interconnecting the said tray lifting means and the said endless conveyor means, ratchet means secured to the said driving sprocket means, linkage means provided with pawl means engaging the said ratchet means, reciprocating disc means connected to the said linkage means imparting intermittent motion thereto, a prime mover connected to drive the said reciprocating disc means, semi-circular end trackage means secured to the other terminal portion of the said channel trackway means for inverting and returning the said trays to the said channel trackway means to repeat the cyclical operation of the said trays, and tray ejecting and replacing means disposed adjacent the said tray lifting means.

4. In an automatic tray conveying machine, including a multiplicity of trays, each tray having a top and two side apron portions depending therefrom, end plates secured to the said top and the said side apron portions and provided with a toothed bottom formation adapted to be grabbed for initial feeding of the said trays, and guide pins secured adjacent the top edges of the said end plates for transference of the said trays from the said initial feeding to a conveyor for further conveyance thereof; channel trackway means supporting the said trays in inverted position, a tray lifting means provided with pin means engaging the root portions of the said toothed bottom formation simultaneously lifting and positioning the said trays face upwardly, driving sprocket means having its vertical axis in the same geometric plane with that of the said tray lifting means, driven sprocket means, endless conveyor means trained to operate on the said driving sprocket means and on the said driven sprocket means for receiving the said trays from the said tray lifting means and conveying the said trays by virtue of the said guide pins resting thereupon, curved trackage means connected to one terminal portion of the said channel trackway means and enveloping substantially the outer portion of the said tray lifting means confining the said trays in their orbit of travel toward being positioned face upwardly, chain transmission means interconnecting the said tray lifting means and the said endless conveyor means, ratchet means secured to the said driving sprocket means, linkage means provided with pawl means engaging the said ratchet means, reciprocating disc means connected to the said linkage means imparting intermittent motion thereto, a prime mover connected to drive the said reciprocating disc means, semi-circular end trackage means secured to the other terminal portion of the said channel trackway means for inverting and returning the said trays to the said channel trackway means to repeat the cyclical operation of the said trays, and endless vertical conveyor means having a concave portion thereof in alignment and configurative with the said semi-circular end trackage means to maintain products resting on the said trays during inversion of the said trays.

5. In an automatic tray conveying machine, including a multiplicty of trays, each tray having a top and two side apron portions depending therefrom, end plates secured to the said top and the said side apron portions and provided with a toothed bottom formation adapted to be grabbed for initial feeding of the said trays, and guide pins secured adjacent the top edges of the said end plates for transference of the said trays from the said initial feeding to a conveyor for further conveyance thereof; channel trackway means supporting the said trays in inverted position, tray lifting means provided with pin means engaging the root portions of the said toothed bottom formation simultaneously lifting and positioning the said trays face upwardly, driving sprocket means having its vertical axis in the same geometric plane with that of the said tray lifting means, driven sprocket means, endless conveyor means trained to operate on the said driving sprocket means and on the said driven sprocket means for receiving the said trays from the said tray lifting means and conveying the said trays by virtue of the said guide pins resting thereupon, curved trackage means connected to one terminal portion of the said channel trackway means and enveloping substantially the outer portion of the said tray lifting means confining the said trays in their orbit of travel toward being positioned face upwardly, chain transmission means interconnecting the said tray lifting means and the said endless conveyor means, ratchet means secured to the said driving sprocket means, linkage means provided with pawl means engaging the said ratchet means, reciprocating disc means connected to the said linkage means imparting intermittent motion thereto, a prime mover connected to drive the said reciprocating disc means, semi-circular end trackage means secured to the other terminal portion of the said channel trackway means for inverting and returning the said trays to the said channel trackway to repeat the cyclical operation of the said trays, tray ejecting and replacing means disposed adjacent the said tray lifting means, and endless vertical conveyor means having a concave portion thereof in alignment and configurative with the said semi-circular end trackage means to maintain products resting on the said trays during inversion of the said trays.

6. In an automatic cake baking machine, including a multiplicity of trays, each tray having a top and two side apron portions depending therefrom, end plates secured to the said top and the said side apron portions and provided with a toothed bottom formation adapted to be grabbed for initial feeding of the said trays, and guide pins secured adjacent the top edges of the said end plates for transference of the said trays from the said initial feeding to a conveyor for further conveyance thereof; channel trackway means supporting the said trays in inverted position, tray lifting means provided with pin means engaging the root portions of the said toothed bottom formation simultaneously lifting and positioning the said trays face upwardly, driving sprocket means having its vertical axis in the same geometric plane with that of the said tray lifting means, driven sprocket means, endless conveyor means trained to operate on the said driving sprocket means and on the said driven sprocket means for receiving the said trays from the said tray lifting means and conveying the said trays by virtue of the said guide pins resting thereupon, curved trackage means connecting to one terminal portion of the said channel trackway means and enveloping substantially the outer portion of the said tray lifting means confining the said trays in their orbit of travel toward being positioned face upwardly, chain transmission means interconnecting the said tray lifting means and the said endless conveyor means, intermittent drive means connected to the said driving sprocket means, a prime mover connected to drive the said intermittent drive means, and semi-circular end trackage means secured to the other terminal portion of the said channel trackway means for inverting and returning the said trays to the said channel trackway means to repeat the cyclical operation of the said trays.

GEORGE REGET.

References Cited in the file of this patent

UNITED STATES PATENTS

| Number | Name | Date |
|---|---|---|
| 794,130 | Sons | July 4, 1905 |
| 852,560 | Igou | May 7, 1907 |
| 1,090,855 | Jagenberg | Mar. 24, 1914 |
| 1,355,091 | Davies | Oct. 5, 1920 |
| 1,455,923 | Mininberg | May 22, 1923 |
| 1,462,468 | Schaller | July 17, 1923 |
| 1,567,153 | Kelly | Dec. 29, 1925 |
| 1,698,786 | Finn | Jan. 15, 1929 |
| 1,883,482 | Bausman et al. | Oct. 18, 1932 |
| 1,885,142 | Reece et al. | Nov. 1, 1932 |
| 1,898,393 | Rickers | Feb. 21, 1933 |
| 1,974,336 | Kremmling | Sept. 18, 1934 |
| 2,070,980 | Wylind | Feb. 16, 1937 |
| 2,236,945 | Gibbs | Apr. 1, 1941 |
| 2,256,168 | Paterson | Sept. 16, 1941 |
| 2,324,930 | Joa | July 20, 1943 |
| 2,365,349 | MacManus | Dec. 19, 1944 |